United States Patent [19]

Collins

[11] 4,443,593

[45] Apr. 17, 1984

[54] SALVAGE OF POLYCARBONATE WASTES BY CONVERSION TO MONOMERIC HYDROXYCARBAMOYL PHENOLS

[75] Inventor: Guy R. Collins, Walnut Creek, Calif.

[73] Assignee: The Dow Chemical Company, Midland, Mich.

[21] Appl. No.: 392,399

[22] Filed: Jun. 25, 1982

[51] Int. Cl.$^3$ ............................................. C08G 63/62
[52] U.S. Cl. ................................... 528/210; 525/462; 525/467; 525/469; 525/470; 528/125; 528/126; 528/128; 528/172; 528/174; 528/211; 528/367; 528/368; 528/369; 560/24; 560/27; 560/29; 560/32; 560/33; 568/680; 568/763
[58] Field of Search ............... 528/210, 211, 125, 126, 528/128, 172, 174, 367–369; 525/462, 467, 469, 470; 568/763, 680; 560/27, 29, 32, 24, 33

[56] References Cited

U.S. PATENT DOCUMENTS 3,223,678  12/1965  Bolgiano ........................... 528/211

Primary Examiner—Lester L. Lee

[57] ABSTRACT

Waste or surplus polycarbonates are salvaged by reacting them with a hydroxy amine in an amount sufficient to cleave about 85% or more of the carbonate groups, thereby converting the polymer to a mixture of dihydroxy monomers—including novel dihydroxy carbamates—which may be converted to useful polymers by reaction with other difunctional monomers having at least one hydroxy-reactive functional group per molecule.

10 Claims, No Drawings

SALVAGE OF POLYCARBONATE WASTES BY CONVERSION TO MONOMERIC HYDROXYCARBAMOYL PHENOLS

BACKGROUND OF THE INVENTION

Production of off-grade polycarbonate batches can occur in even well-designed and well-run plants. It is often not feasible to dispose of the sub-grade polymer by blending it with better grade material. Consequently, unless some method of salvaging the off-grade material can be devised, a substantial waste of both resources and money results.

U.S. Pat. No. 3,223,678 is directed to a method of reducing the length of polycarbonate molecules otherwise unsuited for use in lacquers capable of forming "dry-bright" coatings. The polycarbonate is reacted with morpholine or monoethanolamine, thereby producing a corresponding carbamate-terminated polycarbonate in which the average chain length has been shortened in proportion to the amine to carbonate-moiety ratio employed.

Although amine to polycarbonate ratios high enough to result in cleavage of up to about 80% of the carbonate groups are claimed, nothing is disclosed suggesting that degrading so much of the polymer chain, rather than selecting a lower molecular weight polycarbonate to start with, would be seriously contemplated.

The patent is silent as to the character of the non-polymeric co-products, but it is apparent that the co-products derived from morpholine would not be difunctional and could not be utilized as monomers.

The patent teaches separation of the modified polymer (apparently by selective precipitation during solvent removal) and recognizes no utility for the low molecular weight cleavage fragments (co-products). Further, the greater the extent of chain scission, the less difference there is in molecular weights between the reaction products and the more difficult separation of the modified polymer becomes.

OBJECTS OF THE INVENTION

The primary object of the present invention is to provide a method for essentially complete conversion of off-grade or surplus polycarbonates to monomers which can be copolymerized with other difunctional monomers having at least one hydroxyl-reactive functional group per molecule.

A further object is to provide such monomers as mixtures of bisphenols and novel dihydroxycarbamates (hydroxycarbamoyl phenols, for example).

An additional object is to provide a process of the foregoing type in which a dihydroxycarbamate monomer separates from the reaction mixture.

Another object is to provide access to novel polymers deriveable from the dihydroxycarbamate monomers or from mixtures thereof with said bisphenols.

Still other objects will be made apparent to those knowledgeable in the art by the following specifications and claims.

SUMMARY OF THE INVENTION

The present invention is the method of preparing a reaction mixture containing monomers of the formulas

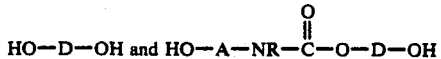

which comprises reacting a polycarbonate of the formula

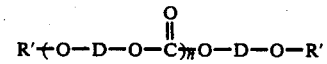

with a hydroxy amine which is at least basic enough to cleave the carbonate groups in a moiety of the formula

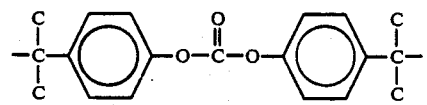

at a temperature of about 100° C. or less and is of the formula RNH—A—OH, the symbols D, A, R, R' and n being defined as follows:

D and A are divalent organic radicals,

R is H or a non-interfering radical,

R', independently in each occurrence is H or a non-interfering radical, and n is an integer greater than 1, the amount of said amine employed being enough to react out at least 85% of the carbonate groups in said polycarbonate.

The foregoing process comprising the additional step of converting the resultant dihydroxycarbamate monomers to polymers is also within the ambit of the present invention.

DETAILED DESCRIPTION

Ideally, complete reaction of a polycarbonate with a stoichiometric amount of a hydroxy-substituted amine may be represented by the following equation (assuming hydroxyl terminations on both ends of the polycarbonate chain):

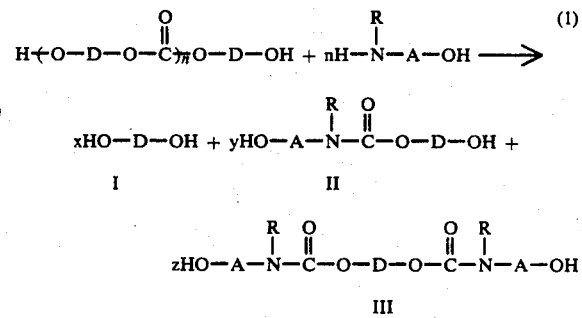

wherein:

A and D are divalent radicals and R is H, alkyl, etc.

$x+y+z=n+1$ $y+2z=n$ $x=[(n-y)/2]+1$ and because z (as well as x and y) must be an integral number equal to (n−y)/2, y can be zero only when n is even (in which case x=(n+2)/2) and the minimum possible value of y when n is odd is 1 (in which case x=(n+1)/2).

If HO—D—OH is bisphenol-A and RNH—A—OH is monoethanolamine, it has been found that product II can be produced to the substantial exclusion of III and is readily recovered in high yield as an essentially pure compound.

Suitable polycarbonates for the practice of the invention are those of the formula

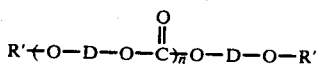  (a)

wherein D is a divalent radical, R'—independently in each occurrence—is H or a non-interfering radical and n is an integer greater than 1.

Polycarbonates of bisphenols (HO—D—OH, including dihydroxy benzenes) are preferred. Polycarbonates of bisphenol A are particularly preferred but those derived from other bisphenols of the formula

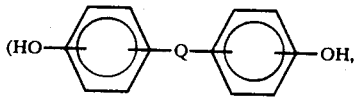

in which —Q— is $C_1$-$C_4$ alkylene or alkenylene, $C(CF_3)_2$, =CO—, —S—, —$SO_2$—, —O— or a valence bond and the phenyl rings may be halo-, alkyl-, or alkenyl substituted) are more preferred than those derived from dihydroxy benzenes.

Suitable hydroxy-substituted amines

are generally those in which the natures of A and R are such that the amine is basic enough to cleave carbonate moieties of the structure

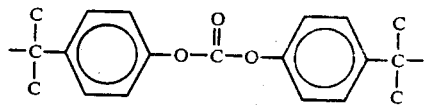

at a temperature of about 100° C. or less.

Hydroxyphenyl amines (phenolic anilines), such as R—NH—$C_6H_4$—OH, are not considered basic enough to react with aromatic carbonates at usefully fast rates. However, hydroxyphenalkyl amines, such as HO—$C_6H_4$—CH(OH)—$CH_2$—$NH_2$, for example) and hydroxyalkyl-substituted anilines, such as HO—$CH_2CH_2$—$C_6H_4$—NRH— in which R is H, alkyl or alkenyl—are considered sufficiently basic.

Another suitable type of phenyl group-containing amines is exemplified by β-amino-α-phenethanol (φ-CHOH$CH_2$—$NH_2$) and 2-methylamino-1-phenyl-1-propanol.

Also suitable hydroxy amines are those having more than one hydroxyl function, as exemplified by diethanolamine, diisopropanolamine, tris(hydroxymethyl)-aminomethane and 2-amino-2-methyl-1,3-propanediol.

Alicyclic hydroxy amines, as exemplified by cis- and trans-2-aminocyclohexanol, 1-amino-1-(hydroxymethyl)cyclopentane and 2-aminoethylcyclohexanol are likewise suitable.

Another suitable type of hydroxy amines are those of the formula R—NH—A—OH, in which R is H or alkyl and A is a polyalkylene oxide diradical of up to about one hundred

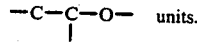 units.

Exemplary of this type of amine are polyglycolamines, such as Union Carbide's "POLYGLYCOLAMINE H-163", HO—$CH_2CH_2$—O—$CH_2CH_2$—O—$CH_2CH_2CH_2$—$NH_2$.

Unsaturated hydroxy amines, as exemplified by $CH_2$=CH—NH—$CH_2CH_2$—OH and $CH_2$=CH—$CH_2$NH—$CH_2CH_2$—OH (which are preparable from vinyl- or allylamine and ethylene oxide in the presence of water and a small amount of hydrochloric acid) are suitable. This type of amine is of particular interest in providing pendant vinyl groups (in the dihydroxycarbamate product) which may be utilized for homopolymerization or for co-polymerization with other vinyl monomers such as—for example—styrene, methylmethacrylate, vinyl chloride and vinylacetate.

The foregoing several types of amines are representative of a class of suitable amines having the formula

R—NH—A—OH wherein,

R is H, alkyl, alkenyl, cycloalkyl, cycloalkenyl, hydroxyalkyl, hydroxycycloalkyl or phenalkyl, and A is alkylene, phenalkylene, cycloalkylene, hydroxyalkylene or 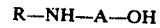, Y being H or $CH_3$ independently in each occurrence and n is an integer of from 2 to about 100, (with the proviso, of course, that when the amine is an aniline, R is other than H).

Hydroxy-substituted amines in which the amine is a secondary amine, i.e., in which R in the preceding formula is other than H, are generally preferred for the practise of the invention. This is for the reason that the carbamate moieties derived from hydroxy primary amines are substantially less stable at elevated temperatures, thus limiting the utility of the monomers comprising them. (It is highly preferred that R be an alkyl group of from 1 to about 5 carbons.) However, by using monoethanolamine (R=H) to cleave bisphenol A polycarbonates, advantage may be taken of the insolubility of the resulting dihydroxycarbamate monomers in reaction media having the character of $CH_2Cl_2$ to separate the latter monomers from the other components of the reaction mixture.

Suitable reactant ratios, i.e., the moles of hydroxy amine employed per polycarbonate group, range from about 0.85 to 1 or more. That is, the amount of the hydroxy amine employed is at least sufficient to convert about 85 percent of the carbonate groups present in the polycarbonate charged to the reaction. In most cases, complete breakdown of the polymer will be preferred and this requires at least a 1:1 ratio. An excess of the hydroxy amine may be employed to speed up complete conversion but is usually not necessary and may complicate work-up or utilization of the reaction mixture per se.

When the polycarbonate is hydroxyl-terminated and the reactant ratio is less than 1:1, some of the monomer molecules produced will include one or more unconverted carbonate groups. In a sense, these molecules will be reactive oligomers, of low enough molecular weight to act as (difunctional) monomers but of high enough molecular weight to substantially modify various polymers (containing hydroxyl-reactive functions), when introduced therein as chain extensions or as pendant moieties.

Suitable reaction media are those inert liquids in which the polycarbonate and the hydroxy amine are sufficiently soluble so that the reaction between them will proceed at a practically useful rate at temperatures below that at which undesired side reaction or thermal degradation of the least stable component of the reaction mixture occurs. By an inert liquid is meant one which does not detrimentally react with any component of the reaction mixture to an intolerable extent.

It is preferred that the reaction medium be of a nature such that the monomer products—particularly the dihydroxy carbamates—can be readily separated out of the reaction mixture, as by solvent stripping, precipitation or extraction. However, in any case, it may be feasible to utilize the reaction mixture as such for the preparation of a variety of new polymers through reactions of the hydroxyl (or vinyl) functions in the monomers. Even when complete breakdown of the polycarbonate is desired, the amount of the hydroxy amine required for the reaction will generally not be such that enough of it to interfere with subsequent reactions of the produced monomers will be left unconverted in the reaction mixture.

The reaction between the carbonate groups and the hydroxy amine generally proceeds at a useful rate at ordinary or moderately elevated temperatures and it is feasible to employ relatively low boiling reaction media without resort to substantially elevated pressures. Thus, for example, the reaction between a bisphenol-A polycarbonate and monoethanolamine proceeded readily in dichloromethane at room temperature.

Other solvents believed suitable as reaction media are dichloroethylene, chlorobenzene, dioxane, glycol ethers, acetone or cyclohexanone (at not substantially elevated temperatures), lower alcohols, esters, dimethylformide and sulfolane.

Suitable Reaction Conditions

The reaction between the polycarbonate and the hydroxy amine proceeds readily at ambient temperatures. However, moderately elevated temperatures, up to say, 100° C., may be employed to speed up the reaction or to ensure adequate solubility of the polymer.

If it is desired to hold a temperature, by refluxing, below or above the normal boiling point of the solvent, reduced or elevated pressure may of course be resorted to. Ordinarily, however, the reaction may be run at ambient pressures.

Agitation, as by stirring, will ordinarily be beneficial. In this regard, it may be noted that a rather dramatic decrease in viscosity is usually apparent, shortly after the hydroxy amine is introduced to the polymer solution. In fact, this phenomena (which suggests that the reaction is not necessarily initiated at the end of the polymer molecule) may be utilized as a criterion for screening hydroxy amines as candidates for the practise of the present invention. (See Example 1, following.)

Suitable contact times range from about half an hour, at elevated temperatures, up to several hours or more at ambient temperatures.

Utilization of the Monomeric Cleavage Products

The dihydroxycarbamate

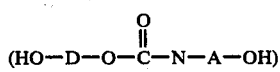

monomers formed in the present process may be copolymerized (as such or in admixture with the coproduced HO—D—OH monomers) with compounds (monomers or oligomers) having more than one hydroxyl-reactive functional group. When the carbamate monomer includes one or more carbonate groups, it will generally be useful for this purpose primarily in the absence of materials or conditions capable of disrupting the carbonate groups. (This latter consideration is a primary reason for preferring to effect conversion of essentially all of the carbonate groups in the starting polycarbonate.)

Exemplary polyfunctional monomers copolymerizeable with those of the present invention include those comprising isocyanate, acid, anhydride, acid halide or oxirane groups. The copolymers preparable from the latter types of monomers have a variety of utilities such as those for which polyurethanes, polyesters and polyhydroxy polyethers are commonly employed.

The hydroxycarbamate monomers produced in the present process—particularly those in which —B— is a phenylene radical—also have utility as intermediates for the preparation of pesticides and drugs.

The following examples are for purposes of illustration and are not to be construed as limiting the present invention in a manner inconsistent with the claims appended to these specifications.

EXAMPLES

EXAMPLE 1

508 Grams (2 grams mer weights) of a bisphenol-A polycarbonate (Merlon M-50-F 1000; Mobay Chemicals Co.) having an average molecular weight of about 30,000 was dissolved in three liters of $CH_2Cl_2$ (in a 4-liter flask) with stirring (by a magnetic stirrer). To the stirring solution was slowly added a solution of 122.6 grams (2.01 gram moles) of 2-aminoethanol (monoethanolamine) in 200 ml of $CH_2Cl_2$. The addition time was 15 minutes but a noticeable viscosity decrease (stirring speed increase at constant stirrer setting) was observed shortly after addition was commenced. After a total of about 20 minutes from the time the addition was started, a white solid began to precipitate. The reaction mixture was allowed to stand unstirred, overnight, and then filtered. The filtrand was dried in vacuo to yield 511 grams (81.1% of theoretical yield) of a powdery, white solid—melting range 182°–4° C.—identified by NMR (nuclear magnetic resonance) and by the following elemental analysis as 4,4'-isopropylidine diphenol-N-hydroxyethyl carbamate ($C_{18}H_{21}NO_4$):

Calc.: C, 68.57; H, 6.67; N, 4.44, Found: C, 67.95; H, 6.75; N, 4.48.

The bisphenol-A presumably present in the filtrate was not isolated.

EXAMPLE 2

(a) Polycarbonate cleavage.

Two hundred fifty grams (1 gram mer weight) of a polycarbonate of essentially the same composition and molecular weight as that employed in the preceding example was dissolved in 2500 ml of $CH_2Cl_2$. 75 Grams (1 gram mol weight) of N-methylethanolamine was added to the solution and the mixture allowed to stir for 5 hours.

(b) Polyester preparation from product monomer mixture, in situ.

202 Grams (2.0 moles) of triethylamine (as a condensation catalyst) was added and the solution transferred to a 5-liter, 3-necked flask fitted with a dropping funnel, reflux condenser and stirrer. Stirring was started and 203 grams (1.0 mole) of terephthaloyl chloride in 1000 ml of $CH_2Cl_2$ was added slowly (the ensuing reaction was exothermic) over a period of about 60 minutes. The reaction mixture was allowed to stir for an additional hour and then to stand overnight. The volume of the mixture was reduced by 50% in a rotary evaporator and the concentrate poured into 3 liters of methanol with stirring. The resultant precipitate was filtered out, washed with methanol and dried in a vacuum oven at 55° C. The dry product was 357 grams (78% of theory) of a white, polymeric solid which gave a clear, hard (and rather brittle) film when cast from $CH_2Cl_2$ solution. The Vicat softening temperature of the polymer was 290° F.

EXAMPLE 3

A polymer from which tougher, more flexible films may be prepared is obtained by repeating Example 2 but employing HO—C—C—O—C—C—O—C—C—C—NH$_2$ instead of N-methylethanolamine.

What is claimed is:

1. The method of preparing a reaction mixture containing monomers of the formulas

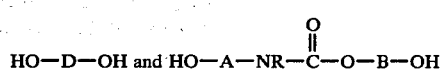

which comprises reacting a polycarbonate of the formula

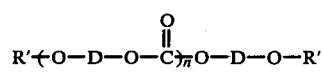

with a hydroxy amine which is at least basic enough to cleave the carbonate groups in a moiety of the formula

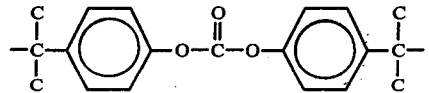

at a temperature of about 100° C. or less and is of the formula RNH—A—OH, the symbols D, A, R, R' and n being defined as follows:

D and A are divalent organic radicals,
R is H or a non-interfering radical,
R', independently in each occurrence is H or a non-interfering radical, and
n is an integer greater than 1,
the amount of said amine employed being enough to react out essentially all of the carbonate groups in said polycarbonate.

2. The method of claim 1 in which:
R is H, alkyl, alkenyl, cycloalkyl, cycloalkenyl, hydroxyalkyl, hydroxycycloalkyl or phenalkyl
and
A is alkylene, phenalkylene, cycloalkylene, hydroxyalkylene or $-(CH_2-CHY-O)_x$, Y being H or $CH_3$, independently in each occurrence and x being an integer of from 2 to about 100.

3. The method of claim 2 in which D is a phenylene radical or is a diradical of the formula

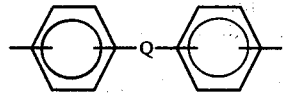

in which Q is $C_1$-$C_4$ alkylene or alkenylene, $C(CF_3)_2$, —CO—, —O—, —S—, —SO$_2$— or a valence bond and the phenyl rings may be halo, alkyl or alkenyl substituted.

4. The method of claim 3 in which D is —C$_6$H$_4$—Q—C$_6$H$_4$— and Q is an isopropylidene radical.

5. The method of claim 3 in which R is an alkyl group.

6. The method of claim 4 in which R is an alkyl group.

7. The method of claim 4 in which R is H, A is —C$_2$H$_4$—, the reaction is carried out in $CH_2Cl_2$ and the hydroxycarbamate group-comprising product precipitates from the reaction mixture.

8. The method of claim 4 in which R is $CH_3$ and A is —C$_2$H$_4$.

9. The method of claim 1 comprising as an additional step copolymerizing the dihydroxycarbamate monomer product with a compound having two or more hydroxyl-reactive functions.

10. The method of claim 9 in which said dihydroxycarbamate monomer is in admixture with the co-produced HO—B—OH monomer and both monomers are copolymerized with said compound.

* * * * *

UNITED STATES PATENT AND TRADEMARK OFFICE
CERTIFICATE OF CORRECTION

PATENT NO. : 4,443,593
DATED : April 17, 1984
INVENTOR(S) : Guy R. Collins

It is certified that error appears in the above—identified patent and that said Letters Patent is hereby corrected as shown below:

Column 4, line 39, "$\text{+CH}_2\text{-CHY-O+}$," should read -- $\text{+CH}_2\text{-CHY-O+}_n$, --;

Column 7, line 47, the "B" in the formula should be deleted and -- D -- inserted;

Column 8, line 50, "$-C_2H_4$" should read -- $-C_2H_4-$ --.

Signed and Sealed this

Twenty-third Day of October 1984

[SEAL]

Attest:

Attesting Officer

GERALD J. MOSSINGHOFF

Commissioner of Patents and Trademarks